United States Patent [19]

Hughes

[11] Patent Number: 5,792,540
[45] Date of Patent: Aug. 11, 1998

[54] FLEXIBLE INSULATION PANEL AND METHOD OF MANUFACTURE

[75] Inventor: John Thomas Hughes, Stanford Bridge, United Kingdom

[73] Assignee: Micropore International Limited, United Kingdom

[21] Appl. No.: 806,035

[22] Filed: Feb. 6, 1997

[30] Foreign Application Priority Data

| Feb. 13, 1996 | [GB] | United Kingdom | 9602874 |
| Mar. 15, 1996 | [GB] | United Kingdom | 9605444 |
| Mar. 29, 1996 | [GB] | United Kingdom | 9606706 |

[51] Int. Cl.⁶ .................................................. B32B 1/06
[52] U.S. Cl. .................. 428/76; 428/153; 428/154; 156/62.2; 156/245; 52/404.1
[58] Field of Search ................ 428/68, 76, 153, 428/152, 154; 156/62.2, 245; 52/404.1

[56] References Cited

U.S. PATENT DOCUMENTS

| 3,389,195 | 6/1968 | Gianakos | 264/45 |
| 4,399,175 | 8/1983 | Kummermehr et al. | 428/76 |
| 4,442,585 | 4/1984 | McGehee, Sr. et al. | 29/432 |

FOREIGN PATENT DOCUMENTS

| 0022581 | 7/1980 | European Pat. Off. . |
| 4106727 | 9/1992 | Germany . |
| 879433 | 10/1959 | United Kingdom . |
| 1350661 | 7/1971 | United Kingdom . |
| 1350661 | 4/1974 | United Kingdom . |
| WO 90/09281 | 8/1990 | WIPO . |

OTHER PUBLICATIONS

European Search Report 22 May 1997.
UK Patent Office Search Report on Application No. 9602874.1 26 Apr. 1996.

*Primary Examiner*—Alexander Thomas
*Attorney, Agent, or Firm*—Ira S. Dorman

[57] ABSTRACT

A flexible thermal insulation panel in the form of a block of consolidated particulate microporous insulation material enclosed in a porous envelope. The block is bonded to the envelope by compression of the envelope to cause penetration of particles of insulation material at the surface of the block into pores of the envelope. The envelope comprises a stretchable material, at least in part. The consolidated block and the stretchable material of the envelope bonded thereto can be conformed to a non-planar surface with the stretchable material of the envelope remaining bonded to the block.

37 Claims, 4 Drawing Sheets

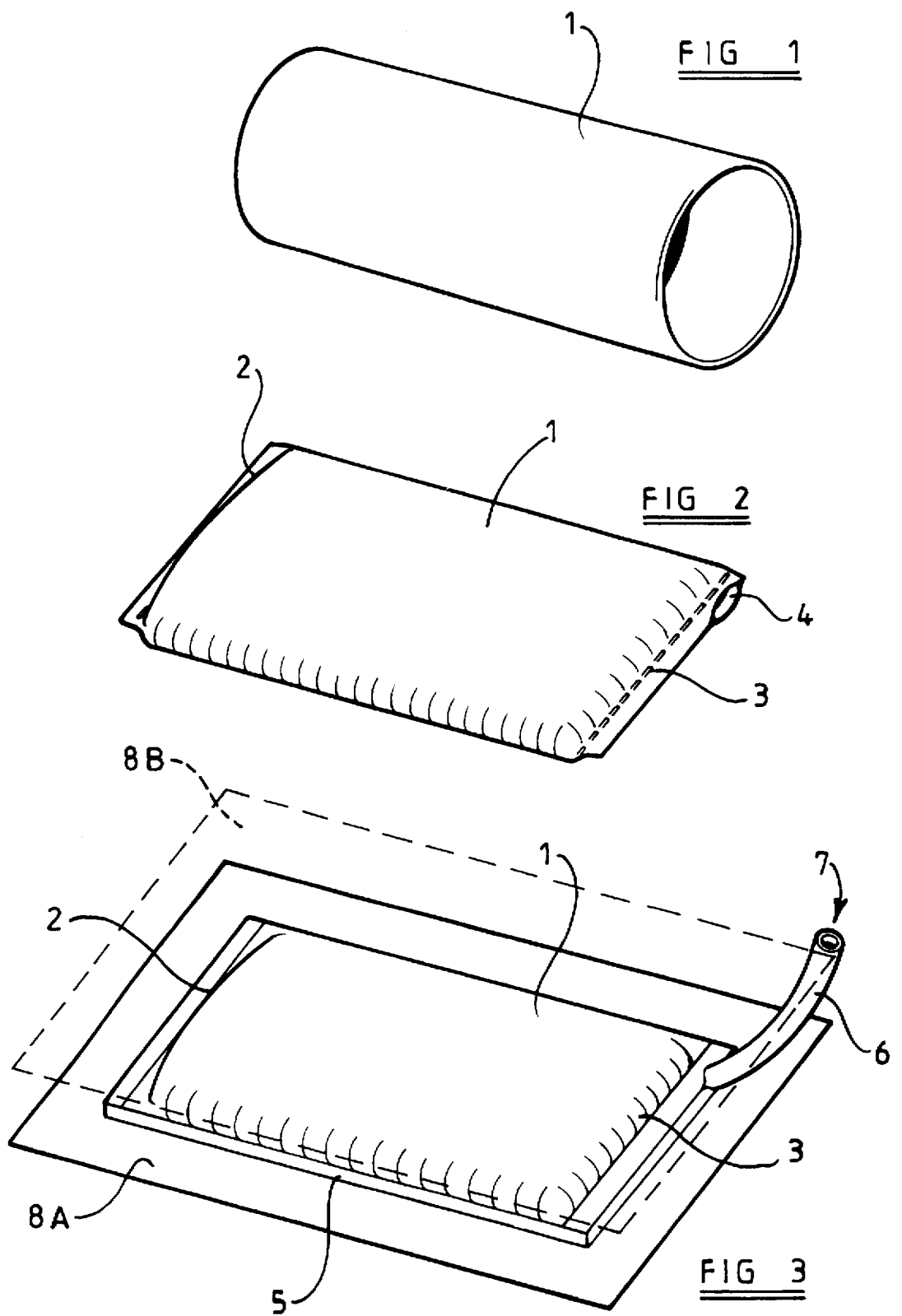

FLEXIBLE INSULATION PANEL AND METHOD OF MANUFACTURE

FIELD OF THE INVENTION

This invention relates to thermal insulation panels incorporating microporous insulation material and their manufacture. More particularly, it relates to insulation panels which are flexible to enable them to be conformed after manufacture to a non-planar, for example curved, surface of a structure with which they are to be associated.

BACKGROUND TO THE INVENTION

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is, due to collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electro-thermal types in which a substantial proportion of the particles have an ultimate particle size less than 100 nm. Any of these materials, based, for example on silica, alumina, other metal oxides, or carbon, may be used to prepare a composition which is microporous as defined above.

Optionally a binder may be added to provide increased strength, in which case a heat treatment may be necessary in order to cure the binder.

DESCRIPTION OF PRIOR ART

A known form of high performance microporous thermal insulation material comprises microporous silica particles compacted to consolidate the material into a handleable form, and typically includes ceramic fibre reinforcement and rutile powder opacifier. Such a microporous thermal insulation material is described, for example, in GB-A-1 350 661.

The insulation material may be provided as a slab or panel by compacting the materials to a sufficiently high density that a substantially rigid form results which is sufficiently robust for handling. However, it is more usual for the compacted material to be contained within an envelope or skin, which provides reinforcement for the compacted material and a dust-free surface.

Panels consisting of a core of microporous insulation material contained within an envelope in which is created a tensile strain have particularly good handleability and are described, for example, in GB-A-1 350 661. In the described process, an envelope is formed consisting, for example, of two rectangular sheets of porous woven glass cloth located on top of one another and sewn together around three sides. Powdered microporous insulation material is poured into the envelope and the envelope is then sealed completely. The resulting filled envelope is then subjected to compaction between opposing plates of a press, during which operation there is a build up of pressure within the envelope as the air within the insulation material is expelled through the woven glass cloth. A tensile strain is thereby created in the glass cloth envelope. Bonding of the envelope to the compacted insulation material occurs as a consequence of particles of the insulation material penetrating pores in the glass cloth of the envelope. The taut glass cloth provides rigidity for the resulting panel, which is substantially inflexible and unable to be subsequently wrapped around any curved object, such as a pipe.

It has also been proposed to provide a porous envelope of cotton, instead of woven glass fabric, to provide a flat panel which is somewhat less rigid, with the slight resultant flexibility enabling the panel to be shaped to fit some contoured surfaces. However, such cotton fabric has hitherto been of woven form, in the same way as glass cloth, and the resulting panel could not be described as flexible to the extent of being able to be wrapped around a pipe of, for example, about 219 mm diameter.

Various means have been adopted to make panels which are more flexible. The panels may be made to conform to an irregular shaped surface by a sewing operation through the panels to cause the envelope material on one major surface to become stitched to envelope material on the opposite major surface. The compacted microporous insulation remains contained between the surface covering sheets of the envelope material. The sewing operation through the panel may be carried out to produce a rectangular lattice pattern such that a somewhat flexible quilted form of panel results.

Another method of producing mechanical flexibility comprises constructing a panel in slatted form whereby individual strips of compacted insulation contained within an envelope are hinged to one another by means of lines of stitching. Such a slatted panel readily conforms to the shape of a cylindrical object, such as a pipe.

OBJECT OF THE INVENTION

These prior art methods of quilting and slatting involve complex manufacturing processes and it is an object of the present invention to provide a flexible panel of compacted microporous insulation material of simple construction, which can be readily subsequently conformed to markedly non-planar surfaces, such as surfaces of cylindrical shape.

SUMMARY OF THE INVENTION

From one aspect, the present invention provides a flexible thermal insulation panel comprising a block of consolidated particulate microporous insulation material enclosed in a porous envelope, the block being bonded to the envelope by penetration of particles of insulation material at the surface of the block into pores of the envelope, the envelope comprising a stretchable material, at least in part, to enable the consolidated block and the stretchable material of the envelope bonded thereto to be conformed to a non-planar surface with the stretchable material of the envelope remaining bonded to the block.

From another aspect, the present invention provides a method of manufacturing a flexible thermal insulation panel comprising:

providing an envelope of porous stretchable material, at least in part;

introducing particulate microporous insulation material into the envelope; and applying pressure to the exterior of the envelope to consolidate the insulation material into block form and bond the envelope material to the surface of the block by penetration of particles of insulation material at the surface of the block into pores of the envelope, whereby to enable the consolidated block and the stretchable material of the envelope bonded thereto to be conformed to a non-planar surface with the stretchable material of the envelope remaining bonded to the block.

The pressure is preferably applied to the exterior of the envelope whilst providing means to control dimensions of the envelope with the insulation material during consolidation thereof. Such means to control the dimensions suitably comprises a frame defining a cavity into which the envelope containing the particulate microporous insulation material is located prior to applying pressure thereto. Such frame may suitably be provided on, or integral with, a die plate of a press used to apply the pressure.

It may be advantageous to arrange for the envelope of stretchable material to be partially stretched while the particulate microporous insulation material is being introduced thereinto. This is suitably arranged by stretching the envelope and securing it, such as by clamping, to a framework prior to introducing the particulate microporous insulation material thereinto. Such framework may comprise the same frame used to control the dimensions of the envelope with the insulation material when the pressure is applied.

In the context of this invention, a stretchable material is a material having a capacity for readily undergoing stretching (otherwise referred to as elongation or extension) upon flexing of the panel whilst providing and maintaining support for the block of insulation material, particularly when the panel has been flexed to conform to a curved surface with which it is required to be associated.

The stretchable material may comprise interlocked loops of yarn, thread, fibre, or filament material, which may be natural or synthetic in form and may be non-metallic or metallic.

The stretchable material comprising interlocked loops of yarn preferably comprises a knitted fabric.

Suitably the knitted fabric comprises or includes cotton, and/or comprises or includes a polymeric plastics material such as a polyester or a polyamide material, and/or comprises or includes a glass material.

Alternatively, the stretchable material may comprise a paper material having stretch properties, particularly crepe paper.

The stretchable material may, if required, be provided having in a plane thereof a greater degree of stretchability in one direction than in another direction. This may be advantageous where close dimensional control of the panel is required and also to optimise flexibility of the panel in a particular orientation.

The envelope of stretchable material may be provided in the form of a tube.

The envelope may be provided partly comprising the stretchable material and partly comprising a porous material which is not a stretchable material.

In this way a flexible thermal insulation panel is produced having first and second opposed major surfaces, the first of which is covered by the stretchable envelope material, and the second of which is covered by envelope material which is not a stretchable material.

In use, such insulation panel is flexed to a required non-planar form in such a way that the first surface is subject to tensile stress and the second surface is subject to compressive stress.

The material which is not a stretchable material may suitably comprise a glass cloth material, for example of woven form.

The envelope of this composition may be formed by locating in overlying contact a sheet of stretchable material and a sheet of material which is not stretchable material and securing the two sheets together along their edges, for example by stitching, or by stapling, or by means of an adhesive or glue, or by means of heat fusing, or by means of an adhesive tape.

The invention is now described by way of example with reference to the accompanying drawings in which:

BRIEF DESCRIPTION OF THE DRAWINGS

FIGS. 1, 2 and 3 are perspective views illustrating steps in manufacturing a flexible insulation panel according to the invention;

DESCRIPTION OF PREFERRED EMBODIMENTS

Figure 4:
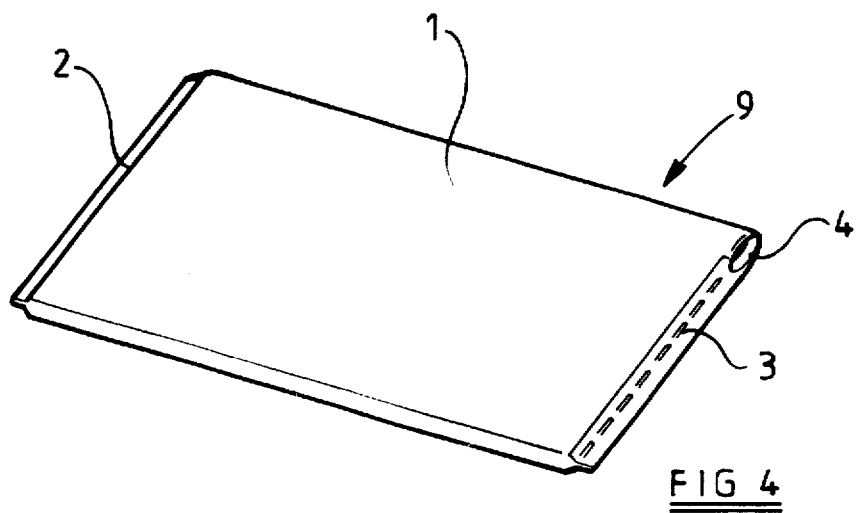
FIG. 4 is a perspective view of a flexible insulation panel according to the invention.

Referring to FIG. 1, an elongate tube 1 of porous stretchable fabric material is provided for use in forming an envelope for a flexible thermal insulation panel. The tube 1 comprises a knitted fabric consisting of interlocked loops of fibres, such as polyamide fibres. A suitable such stretchable fabric is one used for the manufacture of clothes, such as tee shirts. A knitted fabric could, however, be provided comprising other fibre material, or yarn, thread or multifilament material, either natural or synthetic in form. Examples of other materials are cotton, glass, polyester and other plastics materials. Although non-metallic insulation material is generally preferable, a metallic stretchable material comprising knitted metal wire could also be considered.

The stretchable material could also comprise mixed materials.

Alternatively, the porous stretchable material could comprise a paper material having stretch properties, particularly crepe paper.

As shown in FIG. 2, an envelope is formed by flattening the tube 1 and closing one end 2 by means of a row of stitches, using a sewing machine. The other end 3 of the tube is likewise closed by means of a row of stitches, except that a small hole 4 is allowed to remain. Instead of closing the ends of the tube by stitching, other methods could be employed, such as stapling, gluing, heat fusing, or adhesive tape application.

As shown in FIG. 3, the resulting envelope formed from the tube 1 and hereafter designated as envelope 1, is then slightly stretched and clamped at its opposite ends 2 and 3 to a rectangular frame 5, for example of metal, wood or plastics, dimensioned according to the shape and size of flexible insulation panel which is ultimately required.

A tube 6 is fed through a hole in the end of the frame 5 and into the envelope 1 by way of the hole 4 in the end 3 of the envelope. Dry particulate microporous insulation material 7 comprising, for example, 60 percent by weight of fumed silica, 3 percent by weight of reinforcing glass filaments and 37 percent by weight of titania (rutile) opacifier, is then pumped through the tube 6 into the envelope 1. By way of example, 700 grams of the insulation material is pumped into an envelope about 670 mm long and 400 mm wide. The tube 6 is then removed and the resulting hole in the envelope 1 is sealed by insertion of a suitable plug.

The frame 5 with the filled envelope 1 is then located on a lower die plate 8A of a platen press. The press is operated such that the filled envelope 1 is sandwiched between the lower plate 8A and an upper plate 8B. The particulate microporous insulation material is thereby pressurised and consolidated and air contained therein escapes through the pores of the envelope 1 and thence by way of the edges of the frame 5 or by way of holes, not shown, provided in the plates 8A, 8B of the press. The frame 5 controls the dimensions of the filled envelope whilst the pressure is being applied. For some applications it may be possible to dispense with the frame 5, particularly where precise dimensional control is not required.

A thermal insulation panel 9 is thereby produced which, after removal from the press and the frame 5, has the form shown in FIG. 4. If necessary, the hole 4 remaining in the envelope 1 may be subsequently sealed. During the application of pressure in the press, a block of microporous insulation material 7 is formed inside the envelope 1, the block being bonded to the envelope as a result of penetration of particles of microporous insulation material on the surface of the block into the pores of the envelope.

The resulting insulation panel 9, which, in the present example, is about 10 mm thick, about 670 mm long and about 410 mm wide, is flexible to the extent that it can be draped around an object to be thermally insulated without cracking of the compacted microporous insulation material and without loss of adhesion between the envelope 1 and the insulation material 7, as a result of the ability of the material of the envelope to stretch. By way of example, the microporous insulation material is suitably compacted, during pressing, to a density of between about 150 and 400 $kg/m^3$ and typically to about 250 $kg/m^3$.

Figure 5:
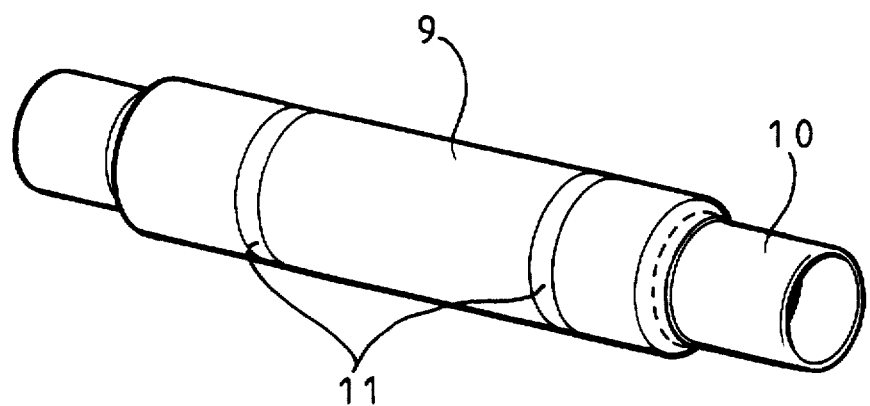
FIG. 5 is a perspective view of the flexible insulation panel of FIG. 4 applied to a pipe for insulation purposes.

The flexible insulation panel 9 is especially suitable for application to cylindrical objects, such as pipes. This is illustrated in FIG. 5.

After draping the panel 9 around a pipe 10 having, for example, a diameter of about 219 mm, the panel 9 is further flexed to completely encircle the pipe 10 and is secured by means such as tape 11.

Flexible insulation panels have been manufactured with a thickness of up to about 15 mm and which are capable of being wrapped around a cylindrical pipe of about 219 mm diameter. However, it is not intended that the invention be limited by such dimensions. Such panels incorporate compacted microporous insulation material having a density of about 250 $kg/m^3$. At higher densities and/or with thicker panels, the resulting panels are somewhat less flexible.

The stretchable material, particularly of knitted fabric form or crepe paper form, used for the envelope 1 of the insulation panel may have, in a plane thereof, a greater degree of stretchability in one direction than in another direction. Consequently the orientation of the material as applied to form the envelope may in such case be selected to optimise the flexibility of the resulting panel and also to ensure optimum dimensional control in its manufacture.

Instead of starting with a tube 1 of stretchable material, two sheets of the material could be provided, overlying one another and suitably secured together at their edges, such as by stitching, stapling, gluing, or heat fusing, or by means of an adhesive tape.

In a further embodiment, a flexible thermal insulation panel is formed having first and second opposed major surfaces, the first of which is covered by the stretchable envelope material and the second of which is covered by envelope material which is not a stretchable material.

Figure 6:
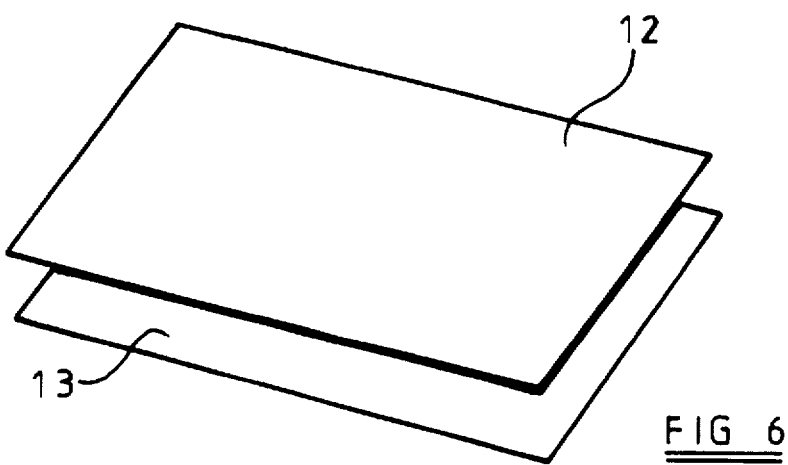
FIGS. 6, 7 and 8 are perspective views illustrating steps in the manufacture of a further flexible insulation panel according to the invention.
Figure 7:
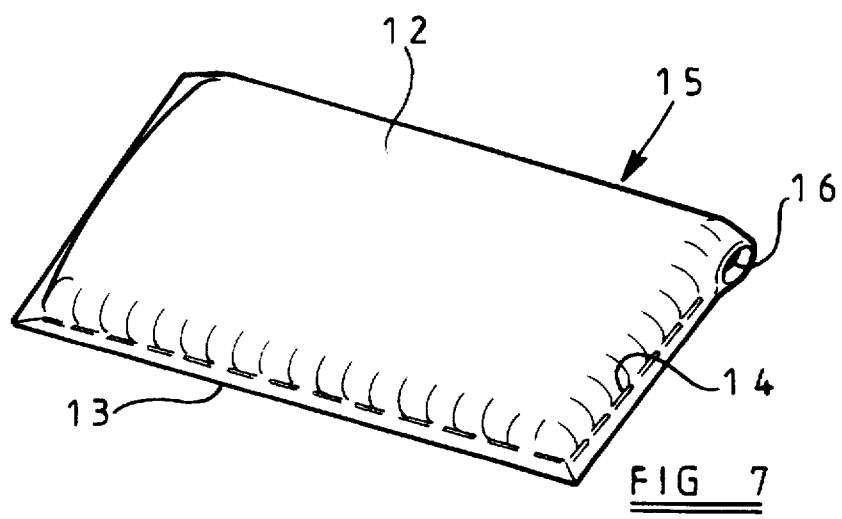

Referring to FIG. 6, a sheet 12 of porous stretchable fabric material is located in overlying contact with a sheet 13 of a material which is not a stretchable fabric material. The sheet 12 is of a stretchable fabric material as previously described with reference to tube 1 in FIG. 1. The sheet 13 suitably comprises a woven glass cloth material. The sheets 12 and 13 are secured together along their edges by means such as stitching 14, or by means of stapling, gluing, or heat fusing, or by means of an adhesive tape. An envelope 15 is thereby formed, as illustrated in FIG. 7, a small hole 16 being allowed to remain at one end.

Figure 8:
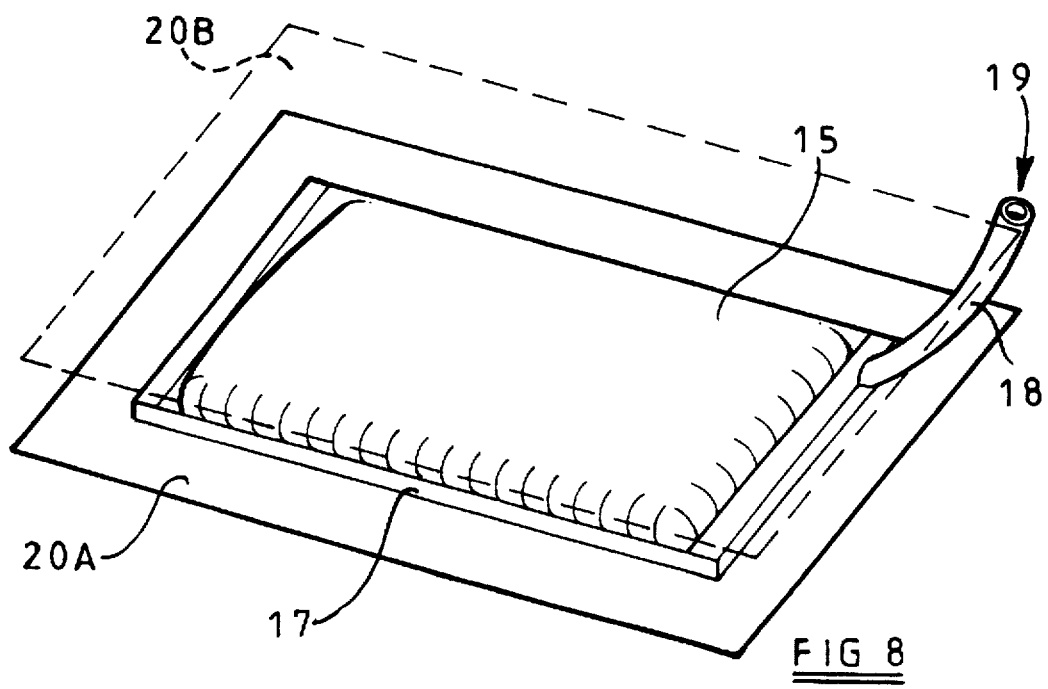

As shown in FIG. 8, the envelope 15 is then located inside a rectangular frame 17, for example of metal, wood, or plastics, dimensioned according to the size of flexible insulation panel which is ultimately required.

A tube 18 is fed through a hole in the end of the frame 17 and into the envelope 15 by way of the hole 16 in the end of the envelope. Dry particulate microporous insulation material 19, comprising, for example, 60 percent by weight of fumed silica, 3 percent by weight of reinforcing glass filaments and 37 percent by weight of titania (rutile) opacifier, is then pumped through the tube 18 into the envelope 15. The tube 18 is then removed and the resulting hole in the envelope 15 is sealed by insertion of a suitable plug.

The frame 17 with the filled envelope 15 is then located on a lower die plate 20A of a platen press. The press is operated such that the filled envelope 15 is sandwiched between the lower plate 20A and an upper plate 20B. The particulate microporous insulation material is thereby pressurised and consolidated and air contained therein escapes through the pores of the envelope 15 and thence by way of the edges of the frame 17 or by way of holes, not shown, provided in the plates 20A, 20B of the press. The frame 17 controls the dimensions of the filled envelope while the pressure is being applied. However, the frame 17 may not be required in the process, particularly where precise dimensional control is not essential.

Figure 9:
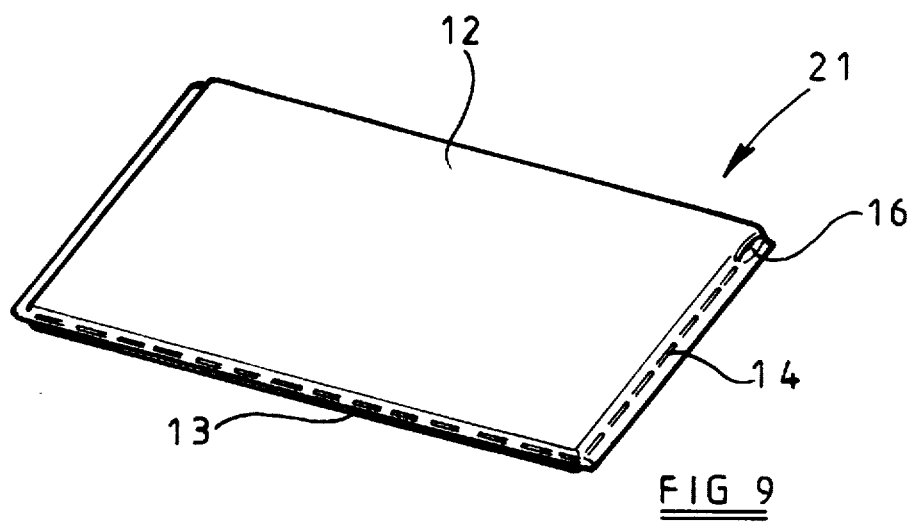
FIG. 9 is a perspective view of the further flexible insulation panel manufactured according to the steps of FIGS. 6, 7 and 8.

A thermal insulation panel 21 is thereby produced which, after removal from the press and the frame, has the form shown in FIG. 9. If necessary, the hole 16 remaining in the envelope 15 may be subsequently sealed. The panel 21 has one major surface covered by the stretchable fabric material 12 of the envelope and an opposite major surface covered by the non-stretchable woven glass cloth material 13 of the envelope.

During the application of pressure in the press, a block of microporous insulation material is formed in the envelope, the block being bonded to the materials 12, 13 of the envelope as a result of penetration of particles of microporous insulation material on the surface of the block into pores of the materials of the envelope.

Figure 10:
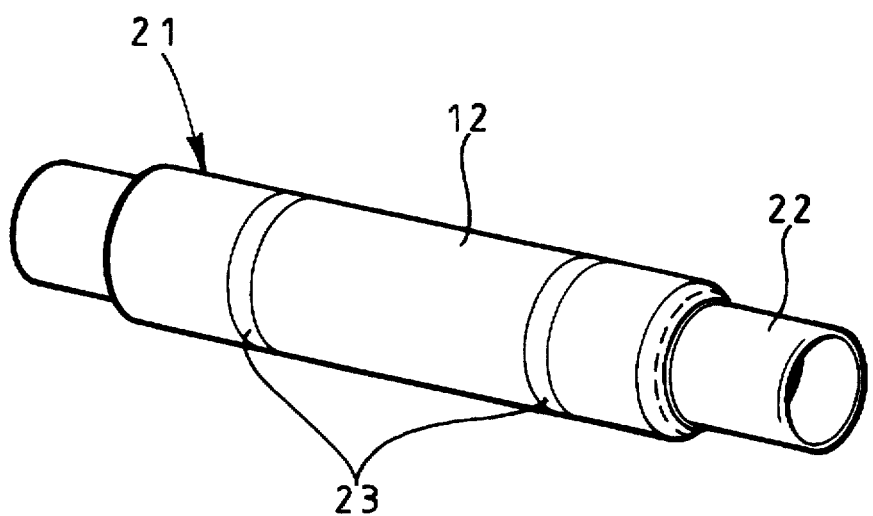
FIG. 10 is a perspective view of the flexible insulation panel of FIG. 9 applied to a pipe for insulation purposes.

The resulting panel is flexible and can be curved around an object to be insulated, such as a cylindrical pipe 22, as shown in FIG. 10. The necessary flexing is achieved by arranging for the major surface of the panel which is covered by the stretchable fabric material 12 to be outermost, and therefore subject to tensile stress, and for the opposite major surface of the panel, which is covered by the non-stretchable woven glass cloth material 13, to be innermost, i.e. in contact with the pipe 22, and therefore subject to compressive stress.

The curved panel is secured to the pipe 22 by means of tape 23.

I claim:

1. A flexible thermal insulation panel comprising a block of consolidated particulate microporous insulation material enclosed in a porous envelope, the block being bonded to the envelope by penetration of particles of insulation material at the surface of the block into pores of the envelope, the envelope comprising a stretchable material, at least in part, to enable the consolidated block and the stretchable material of the envelope bonded thereto to be conformed to a non-planar surface with the stretchable material of the envelope remaining bonded to the block.

2. A panel as claimed in claim 1, wherein the stretchable material is selected from the group consisting of interlocked loops of yarn, thread, fibre, and filament material.

3. A panel as claimed in claim 2, wherein the stretchable material is selected from the group consisting of natural and synthetic materials.

4. A panel as claimed in claim 3, wherein the stretchable material is selected from the group consisting of non-metallic and metallic materials.

5. A panel as claimed in claim 2, wherein the stretchable material comprises a knitted fabric.

6. A panel as claimed in claim 5, wherein the knitted fabric comprises cotton.

7. A panel as claimed in claim 5, wherein the knitted fabric comprises a polymeric plastics material.

8. A panel as claimed in claim 7, wherein the polymeric plastics material is selected from the group consisting of a polyester and a polyamide material.

9. A panel as claimed in claim 5, wherein the knitted fabric comprises a glass material.

10. A panel as claimed in claim 1, wherein the stretchable material comprises a paper material having stretch properties.

11. A panel as claimed in claim 10, wherein the paper material comprises crepe paper.

12. A panel as claimed in claim 1, wherein the stretchable material is provided having in a plane thereof a greater degree of stretchability in one direction than in another direction.

13. A panel as claimed in claim 1, wherein the envelope of stretchable material is provided in the form of a tube.

14. A panel as claimed in claim 1, wherein the envelope is provided partly comprising the stretchable material and partly comprising a porous material which is not a stretchable material.

15. A panel as claimed in claim 14, wherein the panel has first and second opposed major surfaces, the first of which is covered by the stretchable envelope material, and the second of which is covered by envelope material which is not a stretchable material.

16. A panel as claimed in claim 14, wherein the material which is not a stretchable material comprises a glass cloth material.

17. A method of manufacturing a flexible thermal insulation panel comprising:

providing an envelope of porous stretchable material, at least in part;

introducing particulate microporous insulation material into the envelope; and applying pressure to the exterior of the envelope to consolidate the insulation material into block form and bond the envelope material to the surface of the block by penetration of particles of insulation material at the surface of the block into pores of the envelope, whereby to enable the consolidated block and the stretchable material of the envelope bonded thereto to be conformed to a non-planar surface with the stretchable material of the envelope remaining bonded to the block.

18. A method according to claim 17, wherein the pressure is applied to the exterior of the envelope whilst providing means to control dimensions of the envelope with the insulation material during consolidation thereof.

19. A method according to claim 18, wherein the means to control dimensions comprises a frame defining a cavity into which the envelope containing the particulate microporous insulation material is located prior to applying pressure thereto.

20. A method according to claim 19, wherein the frame is provided on, or integral with, a die plate of a press used to apply the pressure.

21. A method according to claim 17, wherein the envelope of stretchable material is partially stretched while the particulate microporous insulation material is being introduced thereinto.

22. A method according to claim 21, wherein the envelope is arranged to be partially stretched and secured to a framework prior to introducing the particulate microporous insulation material thereinto.

23. A method according to claim 17, wherein the stretchable material is selected from the group consisting of interlocked loops of yarn, thread, fibre, and filament material.

24. A method according to claim 23, wherein the stretchable material is selected from the group consisting of natural and synthetic materials.

25. A method according to claim 24, wherein the stretchable material is selected from the group consisting of non-metallic and metallic materials.

26. A method according to claim 23, wherein the stretchable material comprises a knitted fabric.

27. A method according to claim 26, wherein the knitted fabric comprises cotton.

28. A method according to claim 26, wherein the knitted fabric comprises a polymeric plastics material.

29. A method according to claim 28, wherein the polymeric plastics material is selected from the group consisting of a polyester and a polyamide material.

30. A method according to claim 26, wherein the knitted fabric comprises a glass material.

31. A method according to claim 17, wherein the stretchable material comprises a paper material having stretch properties.

32. A method according to claim 31, wherein the paper material comprises crepe paper.

33. A method according to claim 17, wherein the stretchable material is provided having in a plane thereof a greater degree of stretchability in one direction than in another direction.

34. A method according to claim 17, wherein the envelope of stretchable material is provided in the form of a tube.

35. A method according to claim 17, wherein the envelope is provided partly comprising the stretchable material and partly comprising a porous material which is not a stretchable material.

36. A method according to claim 35, wherein the panel has first and second opposed major surfaces, the first of which is covered by the stretchable envelope material, and the second of which is covered by envelope material which is not a stretchable material.

37. A method according to claim 35, wherein the material which is not a stretchable material comprises a glass cloth material.

* * * * *